United States Patent [19]

Hardin

[11] Patent Number: 4,520,671
[45] Date of Patent: Jun. 4, 1985

[54] METHOD AND MEANS FOR REAL TIME IMAGE ZOOM DISPLAY IN AN ULTRASONIC SCANNING SYSTEM

[75] Inventor: William R. Hardin, North Highlands, Calif.

[73] Assignee: General Electric Company, Milwaukee, Wis.

[21] Appl. No.: 503,161

[22] Filed: Jun. 10, 1983

[51] Int. Cl.³ .................. H04N 5/02; G01N 29/00; G06F 3/147
[52] U.S. Cl. .......................... 73/620; 73/621; 73/633; 128/660; 340/731
[58] Field of Search ............. 128/660; 73/621, 633, 73/634, 620; 340/731

[56] References Cited

U.S. PATENT DOCUMENTS

| Re. 31,200 | 4/1983 | Sukonick et al. | 340/731 |
|---|---|---|---|
| 4,231,373 | 11/1980 | Waxman et al. | 73/621 |
| 4,310,907 | 1/1982 | Tachita et al. | 128/660 |
| 4,398,540 | 8/1983 | Takemura et al. | 128/660 |
| 4,417,475 | 11/1983 | Okazaki | 128/660 |
| 4,428,065 | 1/1984 | Duvall et al. | 340/731 |
| 4,431,007 | 2/1984 | Amazeen et al. | 128/660 |
| 4,468,748 | 8/1984 | Leavitt | 73/620 |
| 4,470,303 | 9/1984 | O'Donnell | 73/633 |

*Primary Examiner*—Howard A. Birmiel
*Attorney, Agent, or Firm*—Flehr, Hohbach, Test, Albritton & Herbert

[57] ABSTRACT

Real time image zoom is obtained by sampling electrical signals corresponding to reflected ultrasonic waves at a sampling frequency whereby display data is obtained only in an area of interest. The sampling is delayed to eliminate signals from areas not of interest. Ultrasonic pulse repetition rate is selected so that internal resolution in the area of interest is optimized.

5 Claims, 5 Drawing Figures

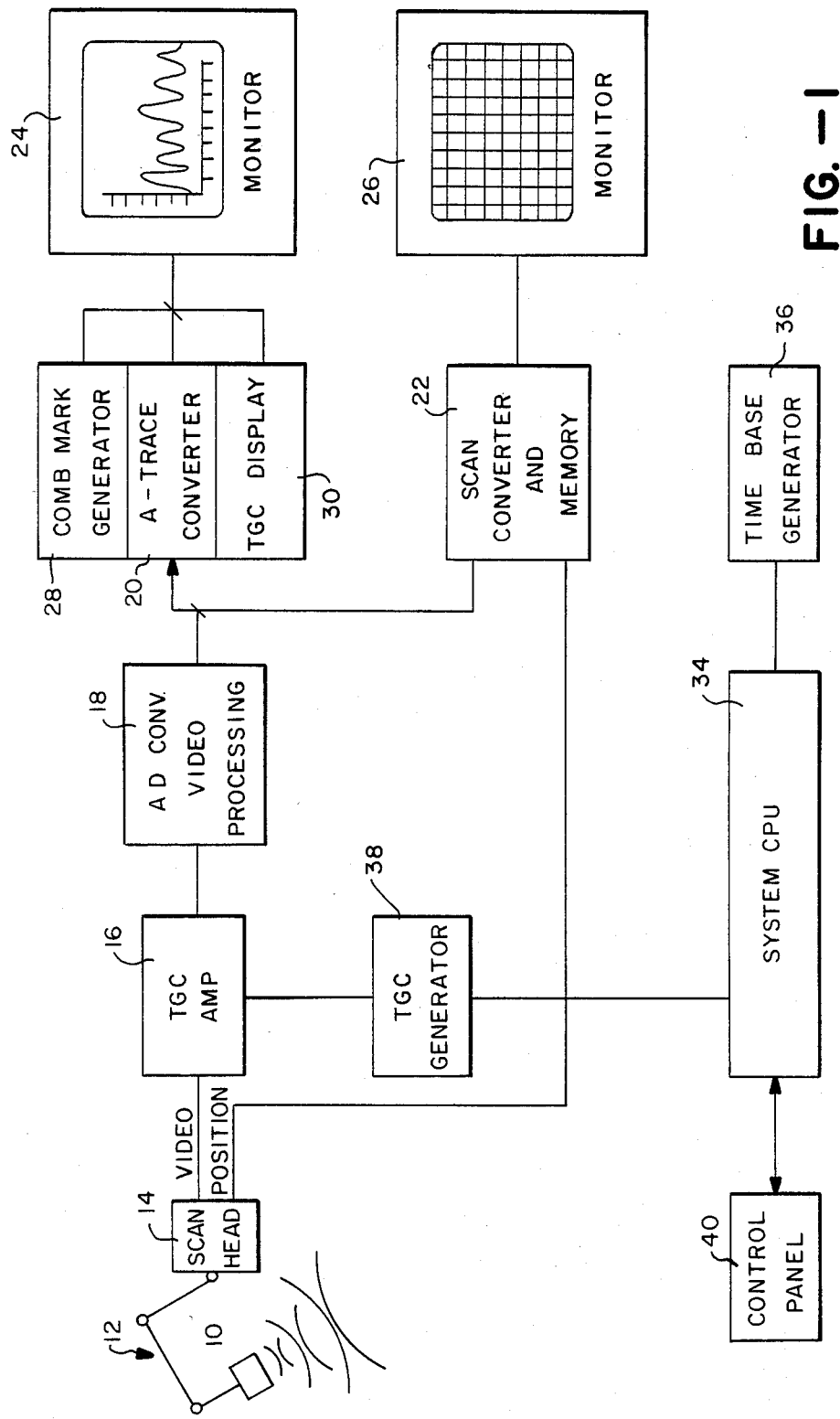
FIG.—1

METHOD AND MEANS FOR REAL TIME IMAGE ZOOM DISPLAY IN AN ULTRASONIC SCANNING SYSTEM

This invention relates generally to ultrasonic scanning systems, and more particularly the invention relates to a method and means for providing real time image zoom displays having improved resolution.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Techniques Select". The commercially available Datason ultrasonic system of General Electric Company provides an A trace display along with both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer position. Alternatively, a hand held transducer or a linear transducer array can be employed. The echo signals are applied to a variable gain amplifier to adjust the echo signals for attenuation when passing through the patient. The adjusted signals are then passed through an analog to digital conversion and video processing circuitry and thence either to standard converter circuitry for controlling the body scan display or to A trace conversion circuitry for graphically depicting the ultrasonic pulse echo. The echo amplitude is typically graphically represented as the ordinate value, while the echo return time (indicative of body depth) is reproduced on the abscissa. Accordingly, by viewing the A trace one may determine the depth into the body of each discontinuity in the pulse propagation path and the type of media transition.

Typically, each vector produced by the transmission and reflection of an ultrasonic wave is sampled 512 times to produce 512 pixel illumination data points. The image data is acquired at a predetermined transducer pulse repetition rate which determines maximum depth of scan and contributes to lateral resolution. A fixed echo data sample rate and spatial frequency of sound determines axial resolution. The vector data is stored in a display memory which is absolutely mapped onto the display monitor or cathode ray tube.

Heretofore, a section of the display image could be enlarged and displayed by an operator controlled zoom function. The selected section of the image, which corresponds to an area of display memory in the digital scan converter, is enlarged by an integer factor (e.g. a factor of two or a doubling of the image size) by dividing the pixel transfer rate by the factor and repeating a line of pixel data for the same integer number of consecutive horizontal scan lines. The display pixels will appear to increase in size by the integer factor thereby increasing the displayed size of the selected image section by the same factor but with no increase in either axial or lateral resolution.

An object of the present invention is an improved method of selectively enlarging portions of a displayed image in real time.

Another object of the invention is an enlarged display portion having improved resolution.

A further object of the invention is a method and means for producing real time enlargements of a portion of a display image in an ultrasound imaging system.

Briefly, enlarged portions of a displayed object are realized in an ultrasound scanning system by transmitting an ultrasonic wave at a pulse repetition rate which allows reception of reflected waves from the maximum depth of the display area of interest. The reflected or echo signal is sampled beginning at a point corresponding to reflections from the closest portion of the area of interest. The sampling frequency of the reflected wave data is chosen so that a maximum number of data points are established along the vector in the area of interest. By increasing the data sample rate and limiting the area to be sampled to the image portion encompassed by the zoom window, the digital scan converter display memory will be filled with data obtained within the window of interest. Importantly, by properly choosing the pulse repetition frequency and the data sample rate, real time enlarged pictures of the area of interest are generated.

The invention and objects and features thereof will be more readily apparent from the following detailed description and appended claims when taken with the drawing, in which:

FIG. 1 is a functional block diagram of an ultrasound imaging system.

Figure 4:
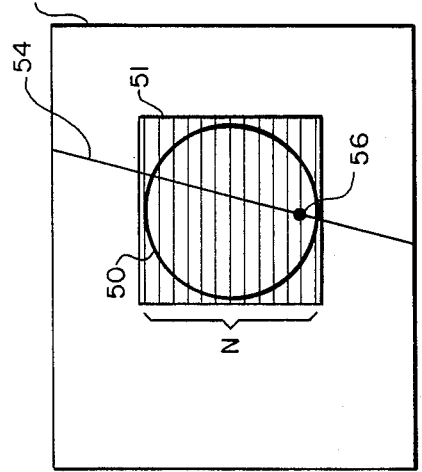
FIG. 4 is a view of a video display of a portion of the image of FIG. 2 in accordance with the present invention.

Referring now to the drawings, FIG. 1 is a functional block diagram of an ultrasonic scanner. In this embodiment the system includes a transducer 10 mounted on a hinged arm system shown generally at 12 whereby transducer 10 can move freely in a single plane. Potentiometers in scanhead 14 and associated with the arms of the system generate signals indicative of the X and Y position of the scanner 10 in the plane of motion.

Transducer 10 transmits ultrasonic signals (e.g. on the order of 3 megahertz) and generates electrical signals in response to reflections of the transmitted ultrasonic signals. The generated signals are attenuated in time due to attenuation of the ultrasonic signal in passing through a patient.

The attenuated video signal is then applied to a variable gain amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each horizontal position. This data controls the intensity of the electron beam in the display during raster line scanning by the beam. Scale markings for the displayed A trace are generated by comb mark generator 28, and a time gain compensation curve is provided by generator 30.

A section view of the patient is displayed on monitor 26 in response to the scan converter and memory 22. The signal from circuitry 18 is converted for storage in a 512×512 memory matrix with each point in the matrix accommodating a 5 bit brightness code. The matrix corresponds to the pixels on the display of monitor 26 with the brightness code being indicative of the Grayscale for the pixels.

System control is provided by a central processing unit 34 which also controls a time base generator 36 which generates the timing signals for the system. A time gain compensation (TGC) control generator 38 generates the control signal for amplifier 16 and a control panel 40 is provided for manual control of the system through the central processing unit.

In a video A trace display system such as described in U.S. Pat. No. 4,172,386, supra, data for controlling the illumination of raster scan lines in the TV display is stored in a memory having a plurality of addresses corresponding to increments of the raster scan lines of the television display with the data indicating video signal magnitude at each increment. For example, each raster line may be defined by 1000 addressable positions. The contents of the memory are read out during each raster line scan in the sequence in which they were stored with the data converted to an intensity modulated signal in a format compatible with the raster line scan of the video beam whereby a video display of the A trace is produced.

Figure 3:
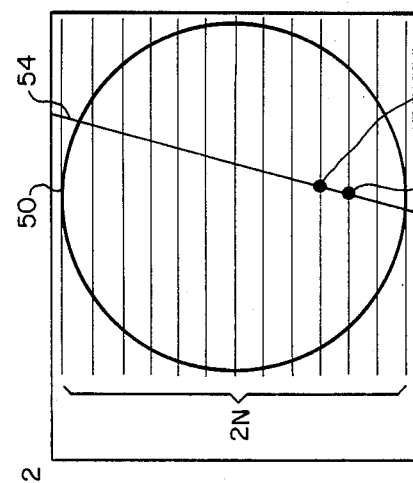
FIG. 3 is a view of an enlarged portion of the displayed image of FIG. 2 in accordance with the prior art.
Figure 2:
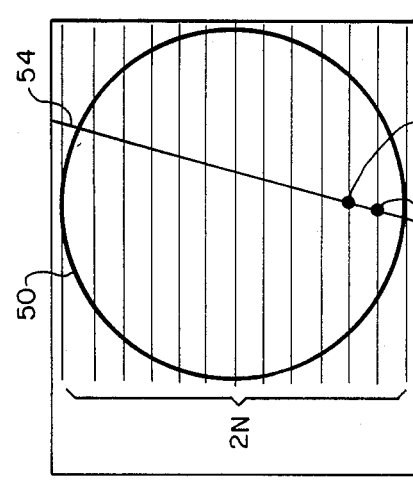
FIG. 2 is a view of a video display and image of an ultrasound imaging system.

Heretofore, a portion of an image display has been enlarged by a display zoom window by repeating lines of pixel data within the portion so that sufficient data is provided to increase perceived size by an integer factor. This is illustrated in FIGS. 2 and 3 of the drawing. In FIG. 2, an image 50 is shown in a display 52 with data located along a vector 54 being used in combination with data from other vectors to define the image 50. For example, a plurality of data points along the vector 54 (e.g. 512 data points) are established and utilized to illuminate raster scan lines in the display 52 corresponding to the image 50. In the illustration of FIG. 2, N raster lines are shown with each raster line having a corresponding data point along the vector 54, such as the data point 56. Thus, in displaying the image 50 on the display 52 each of the raster lines N is illuminated in accordance with illumination data generated for the plurality of vectors.

In FIG. 3 the image 50 inside of the zoom window 51 is increased in size using a prior art technique. In this embodiment the image 50 is doubled in size so that two N raster scan lines are required in displaying the zoom window 51 and the image 50 on the display. In order to provide sufficient data for illuminating twice as many scan lines, the stored data generated for the vector 54 is repeated twice so that pairs of raster scan lines are illuminated using the same recorded data. For example, the data for point 56 is repeated at 56' for illuminating two adjacent raster scan lines. Similarly, other data points along the vector 54 are repeated so that the two N scan lines can be illuminated. As noted above, the image appears to double in size, but there is no increase in either axial or lateral resolution in the picture. Further, real time imaging is not possible since previously stored data must be repeated.

In accordance with the present invention data for each of the two N raster scan lines is obtained by doubling the data sample rate for the vector 54. For 2×zoom example, if the data sample rate is normally 1 megahertz, the sampling rate is increased to 2 megahertz and the vector is sampled only along the image area of interest corresponding to the zoom window. For example, in FIG. 4 the image 50 is doubled in size by illuminating 2 N raster scan lines using data obtained by doubling the sampling frequency for the vectors intercepting the area 50 of interest. For example, the data point 56 along the vector 54 is again obtained as in FIGS. 2 and 3, but an additional data point 58 is obtained and used for illuminating the adjacent scan line. Thus, not only is image resolution improved but also real time zoom pictures can be displayed, and viewing area can be scrolled in real time.

Figure 5:
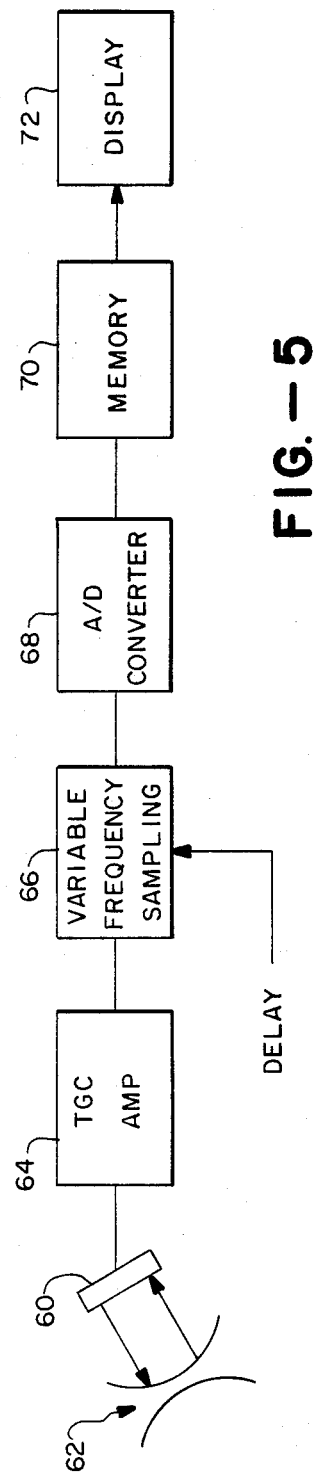
FIG. 5 is a functional block diagram of apparatus for sampling a video signal in accordance with one embodiment of the invention.

FIG. 5 is a functional block diagram of circuitry used in the system of FIG. 1, for example, for practicing the invention. The ultrasonic transducer 60 transmits and receives the ultrasonic waves 62 at the maximum pulse repetition rate which allows reception of echoes from all of the areas of interest in the zoom windows with improved lateral resolution. Electrical signals from transducers 60 are then passed through time gain control amplifier 64 to a variable frequency sampling circuitry 66. Sampling of the amplified signal is delayed so that only signals from the area of interest will be processed. The sampled data along each vector is then passed through the analog to digital converter 68 and then stored in the memory 70 which is mapped to correspond to the pixels of display 72. Image data within the desired zoom window fills the memory 70 which in turn controls the display 72 and thereby accomplishes the zoom enlarging function while increasing the resolution of the displayed area. Both real time imaging and stored or "frozen" imaging is thus realized.

There has been described an improved method and apparatus for enlarging images in an ultrasound scanning system and increasing the resolution of the displayed images. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasound imaging system in which a display is controlled by electrical signals based on reflected ultrasonic waves, a method of varying the size of a displayed area based on a user selected scale factor and user selected start and stop points comprising the steps of transmitting ultrasonic pulses,
generating electrical signals in response to echoes of said ultrasonic pulses,
sampling said electrical signals at a plurality of sampling rates depending on a scale factor indicative of desired size of a display image said step of sampling being delayed after said step of transmitting ultrasonic pulses whereby sampled signals are obtained only from a limited area as established by user selected start and stop points,
generating pixel illumination data corresponding to the sampled electrical signals, and
controlling scan lines in said display image by said pixel illumination data.

2. The method as defined by claim 1 wherein said step of transmitting ultrasonic pulses is at a maximum repetition rate selected to permit optimal lateral resolution with minimal interpolated pixels from an area to be displayed.

3. In an ultrasonic imaging system in which a display is controlled by electrical signals based on reflected ultrasonic waves, apparatus for providing display control data dependent on a user selected scale factor and user selected start and stop points comprising means for sampling said electrical signals at a plurality of sampling rates depending on a scale factor indicative of desired size of a display image, said means for sampling including delay means for delaying the sampling of electrical signals whereby only signals from a limited area of interest are sampled, as established by the user selected start and stop points, and means for generating pixel illumination data corresponding to the sampled electrical signals.

4. Apparatus as defined by claim 3 wherein said means for generating pixel illumination data includes analog to digital signal conversion means for generating digital data for pixel illumination control.

5. Apparatus as defined by claim 4 and further including memory means for storing said digital data.

* * * * *